(12) United States Patent
Yada et al.

(10) Patent No.: US 10,179,627 B2
(45) Date of Patent: Jan. 15, 2019

(54) FRICTIONAL PROPULSION DEVICE AND VEHICLE USING SAME

(71) Applicant: HONDA MOTOR CO., LTD., Minato-ku, Tokyo (JP)

(72) Inventors: Wataru Yada, Tokyo (JP); Tsutomu Yoshino, Saitama (JP); Jun Inada, Fuchu (JP)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 15/410,880

(22) Filed: Jan. 20, 2017

(65) Prior Publication Data

US 2017/0210444 A1    Jul. 27, 2017

(30) Foreign Application Priority Data

Jan. 25, 2016    (JP) .................................. 2016-011805

(51) Int. Cl.
*B62M 13/00* (2010.01)
*B60B 19/00* (2006.01)
(Continued)

(52) U.S. Cl.
CPC ........... *B62M 13/00* (2013.01); *B60B 19/003* (2013.01); *B60B 19/12* (2013.01); *B60B 19/125* (2013.01); *B60B 27/0015* (2013.01); *B62H 1/12* (2013.01); *B62J 1/00* (2013.01); *B62J 25/00* (2013.01); *B62K 1/00* (2013.01); *B62K 11/007* (2016.11);
(Continued)

(58) Field of Classification Search
CPC ....... B60B 19/003; B62K 11/007; B62K 1/00; B62M 13/00; B62M 13/02; B62M 13/04
See application file for complete search history.

(56) References Cited

U.S. PATENT DOCUMENTS 8,162,092 B2 * 4/2012 Takenaka .............. B60B 19/003
180/221
8,220,571 B2 * 7/2012 Gomi ...................... B62K 1/00
180/21

(Continued)

FOREIGN PATENT DOCUMENTS

JP    2011-063209 A    3/2011
JP    2013-107575 A    6/2013
(Continued)

*Primary Examiner* — Kevin Hurley
*Assistant Examiner* — Michael R Stabley
(74) *Attorney, Agent, or Firm* — Carrier Blackman & Associates, P.C.; Joseph P. Carrier; Anne G. Sabourin

(57) ABSTRACT

In a propulsion device including a main wheel having a plurality of driven rollers fitted on and arranged circumferentially along an annular core member so as to be rotatable around tangential lines of the annular core member at respective positions thereof on the annular core member, a pair of drive disks positioned on either side of the main wheel in an individually rotatable manner, a plurality of drive rollers supported along an outer periphery of each drive disk so as to be each rotatable around a rotational center line extending in a skewed relationship to a rotational center line of the corresponding drive disk, and a drive unit for individually rotatively driving the drive disks, a plurality of guide rollers are rotatably supported by a body frame and engage at least one driven roller not engaged by any of the drive rollers from either side.

9 Claims, 5 Drawing Sheets

(51) Int. Cl.
  *B60B 19/12* (2006.01)
  *B62J 1/00* (2006.01)
  *B62J 25/00* (2006.01)
  *B62K 1/00* (2006.01)
  *B62K 11/10* (2006.01)
  *B62K 21/00* (2006.01)
  *F16H 13/04* (2006.01)
  *B60B 27/00* (2006.01)
  *B62H 1/12* (2006.01)
  *B62K 11/00* (2006.01)

(52) U.S. Cl.
  CPC .............. *B62K 11/10* (2013.01); *B62K 21/00* (2013.01); *F16H 13/04* (2013.01); *B60B 2340/14* (2013.01); *B60B 2360/10* (2013.01); *B60B 2380/12* (2013.01); *B62K 2204/00* (2013.01); *B62K 2208/00* (2013.01)

(56) References Cited

U.S. PATENT DOCUMENTS

| | | | | |
|---|---|---|---|---|
| 8,342,270 | B2 | 1/2013 | Takenaka et al. | |
| 8,353,378 | B2* | 1/2013 | Gomi | B60B 19/003 180/218 |
| 8,356,681 | B2* | 1/2013 | Gomi | B60B 19/003 180/20 |
| 8,403,084 | B2* | 3/2013 | Gomi | B60B 3/048 180/10 |
| 8,499,865 | B2* | 8/2013 | Takenaka | B60B 19/003 180/21 |
| 8,567,535 | B2* | 10/2013 | Takenaka | B62K 1/00 180/21 |
| 8,645,030 | B2* | 2/2014 | Kobashi | B60B 3/048 701/49 |
| 8,708,068 | B2 | 4/2014 | Yada | |
| 8,776,934 | B2* | 7/2014 | Muto | B62H 1/12 180/21 |
| 9,199,685 | B2* | 12/2015 | Shimizu | B62K 3/007 |
| 9,630,447 | B2* | 4/2017 | Yoshino | B60B 19/003 |
| 9,731,547 | B2* | 8/2017 | Yoshino | B60B 19/003 |
| 9,809,277 | B2* | 11/2017 | Yoshino | B60B 19/003 |
| 2011/0070997 | A1* | 3/2011 | Gomi | B60B 9/06 476/66 |
| 2012/0032496 | A1* | 2/2012 | Takenaka | B60B 19/003 301/5.23 |
| 2014/0353051 | A1* | 12/2014 | Yada | B62K 1/00 180/6.2 |
| 2015/0129327 | A1* | 5/2015 | Yoshino | B60B 19/003 180/6.5 |
| 2016/0303899 | A1* | 10/2016 | Yoshino | B60B 19/003 |
| 2016/0304163 | A1* | 10/2016 | Yoshino | B60B 19/003 |

FOREIGN PATENT DOCUMENTS

| | | |
|---|---|---|
| JP | 2013-237327 A | 11/2013 |
| WO | 2008/132779 A1 | 11/2008 |

\* cited by examiner

FRICTIONAL PROPULSION DEVICE AND VEHICLE USING SAME

TECHNICAL FIELD

The present invention relates to a frictional propulsion device and a vehicle using a frictional propulsion device, and in particular to a frictional propulsion device configured as an omni-directional propulsion device and a vehicle using such a frictional propulsion device.

BACKGROUND ART

A known frictional propulsion device for an omni-directional vehicle comprises a main wheel including an annular core member and a plurality of driven rollers (free rollers) fitted on the annular core member such that each driven roller may be freely rotatable around the tangential line of the annular core member at the corresponding position, and a pair of drive disks provided on either side of the main wheel each including a disk member and a plurality of drive rollers (free rollers) arranged along the outer periphery of the disk member and engaging the driven rollers of the main wheel so as to be each rotatable around a rotational center line at an angle to both the lateral direction and the radial direction. See WO2008/132779A1, JP2013-237327A, JP2011-63209A and JP2013-107575A, for instance.

In the disclosed frictional propulsion devices, the drive disks are rotatably supported by the body frame of the omni-directional vehicle and are individually actuated by separate electric motors so that the vehicle can be propelled in the fore and aft, oblique and lateral directions.

In these frictional propulsion devices, the main wheel is supported solely by the drive rollers supported by the drive disks flanking the main wheel and engaging the driven rollers of the main wheel. Therefore, if the drive rollers are not firmly pushed against the main wheel, the main wheel may tilt sideways or wobble as the main wheel rolls over the road surface. This tendency is particularly significant when the diameter of the drive disks is reduced, and the drive rollers engage only those driven rollers which are situated in a lower part of the main wheel.

BRIEF SUMMARY OF THE INVENTION

The present invention was made in view of such problems of the prior art, and has a primary object to provide a frictional propulsion device in which the main wheel is effectively prevented from tilting sideways or wobbling as the main wheel rolls over the road surface.

To achieve such an object, the present invention provides a frictional propulsion device, comprising: a body frame (10); a main wheel (30) including an annular core member (32) having a rotational center line extending laterally and a plurality of driven rollers (34) fitted on and arranged circumferentially along the annular core member so as to be rotatable around tangential lines of the annular core member at respective positions thereof on the annular core member; a support shaft (22) supported by the body frame and extending laterally across an interior of the main wheel; a pair of drive disks (70) positioned on either side of the main wheel and rotatably supported by the support shaft; a plurality of drive rollers (76) supported along an outer periphery of each drive disk so as to be each rotatable around a rotational center line extending in a skewed relationship to a rotational center line of the corresponding drive disk, an outer circumferential surface of each drive roller being in engagement with an outer circumferential surface of the driven rollers; a drive unit (64) supported by the body frame to individually rotatively drive the drive disks; and a plurality of guide rollers (104) rotatably supported by the body frame and engaging at least one of the driven rollers not engaged by any of the drive rollers from either side.

Thus, the main wheel is prevented from tilting sideways by the guide rollers so that the drive rollers can maintain a stable contact with the driven rollers at all times, and a stable operation of the propulsion device can be ensured.

Preferably, a rotational center line of each guide roller extends in a radial direction of a circle defined by a cross sectional center of the core member when projected onto a plane containing the circle defined by the cross sectional center of the core member.

Thereby, the guide rollers can rotate around the respective rotational center lines as the main wheel rotates around the rotational center line thereof so that the rotation of the main wheel is not obstructed by the guide rollers.

Preferably, each guide roller engages the driven rollers at a point inward of the circle defined by the cross sectional center of the core member, and the guide rollers interpose the driven rollers from either side such that the rotational center lines of the guide rollers interposing the driven rollers from either side form an angle smaller than 90 degrees.

Thereby, the yaw movement and the fore and aft movement of the main wheel relative to the body frame can be prevented in an effective manner Preferably, each guide roller engages the driven rollers at a point higher than the rotational center line of the main wheel.

Thereby, the vertical movement of the main wheel relative to the body frame can be prevented. Therefore, when the body frame is lifted, the main wheel is prevented from sagging down from the body frame.

According to a preferred embodiment of the present invention, the guide rollers engage the driven rollers at a point inward of the circle defined by the cross sectional center of the core member, and are arranged on each side of a front part of the main wheel and a rear part of the main wheel.

Thereby, the main wheel is maintained in position at all times with a minimum number of guide rollers.

Preferably, the guide rollers are arranged in adjoining pairs on each side of a front part of the main wheel and a rear part of the main wheel, and the guide rollers of each adjoining pair are angularly spaced from each other by N and a half times of an angular spacing between the adjoining driven rollers, N being a natural number.

Thereby, at least one of each pair of guide rollers is in contact with one of the driven rollers at all times so that the main wheel can be retained in position by the drive rollers without regard to the angular position of the main wheel.

According to a preferred embodiment of the present invention a drive contact circle defined by points on the drive rollers at which the drive rollers contact the driven rollers is substantially smaller than a driven contact circle defined by points on the driven rollers at which the driven rollers contact the drive rollers, and the drive rollers engage only those driven rollers that are located in a lower part of the main wheel.

Thereby, the size of the drive disks can be reduced, and the required number of drive rollers can be minimized. This contributes to the reduction in weight and the number of component parts. By not driving the driven rollers that are not engaging the road surface, the power efficiency can be improved.

Preferably, a rotational center line of the support shaft extends in parallel with the rotational center line of the main wheel, and the drive contact circle and the driven contact circle define planes that are parallel to each other.

Thereby, the lateral expanse of the drive disks can be limited, and the lateral dimension of the device can be minimized The present invention further provides a vehicle comprising such a frictional propulsion device, a saddle mounted on an upper part of the body frame, and a pair of foot rests projecting laterally from either side of a lower part of the body frame.

Thus, the present invention provides a frictional propulsion device in which the main wheel is effectively prevented from tilting sideways or wobbling as the main wheel rolls over the road surface, and a vehicle fitted with such a propulsion device.

BRIEF DESCRIPTION OF THE DRAWING(S)

DESCRIPTION OF THE PREFERRED EMBODIMENT(S)

An inverted pendulum vehicle of a riding type incorporated with a frictional propulsion device according to the present invention is described in the following with reference to the appended drawings.

Figure 1:
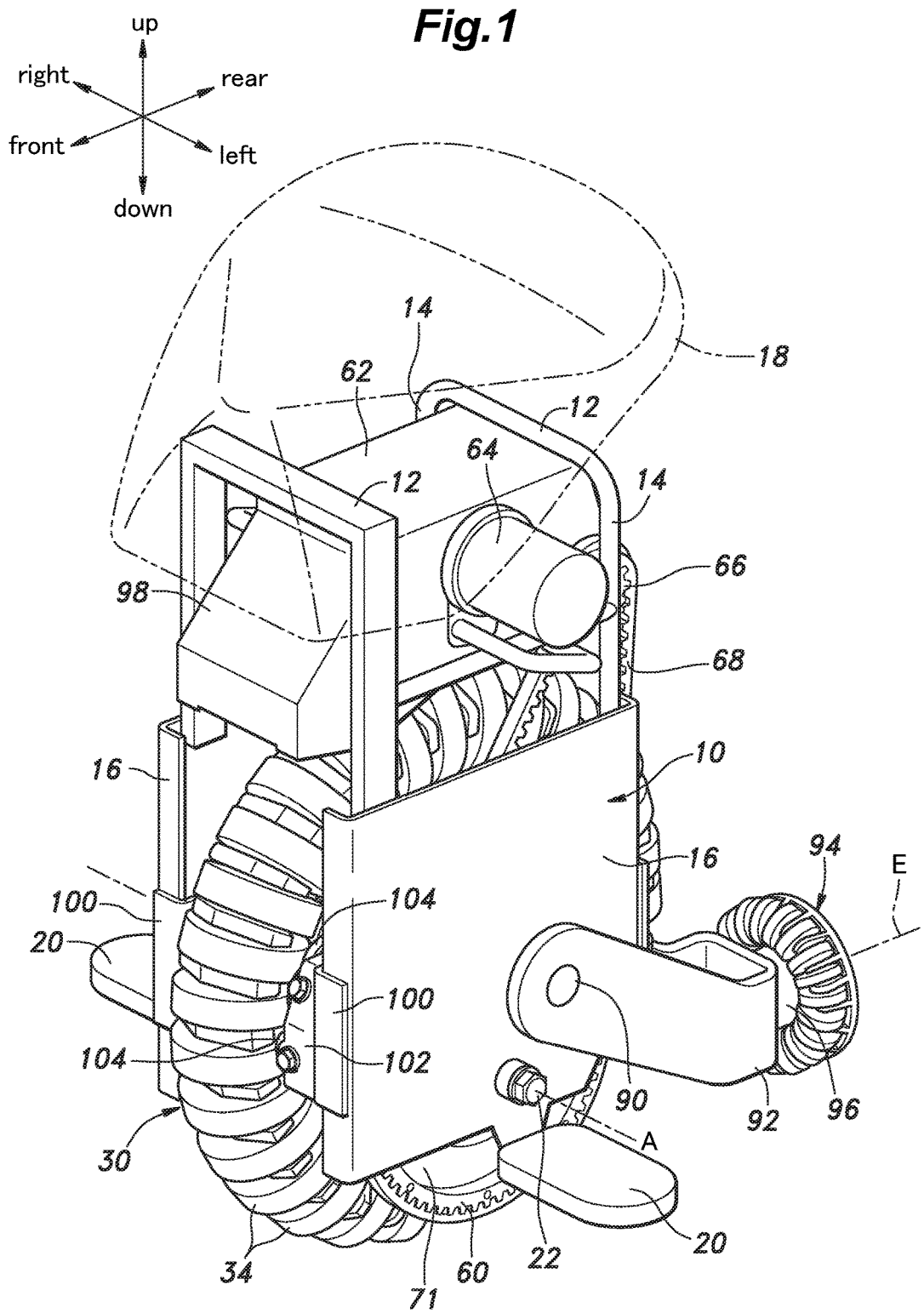
FIG. 1 is a perspective view of an inverted pendulum vehicle employing a frictional propulsion device embodying the present invention.
Figure 2:
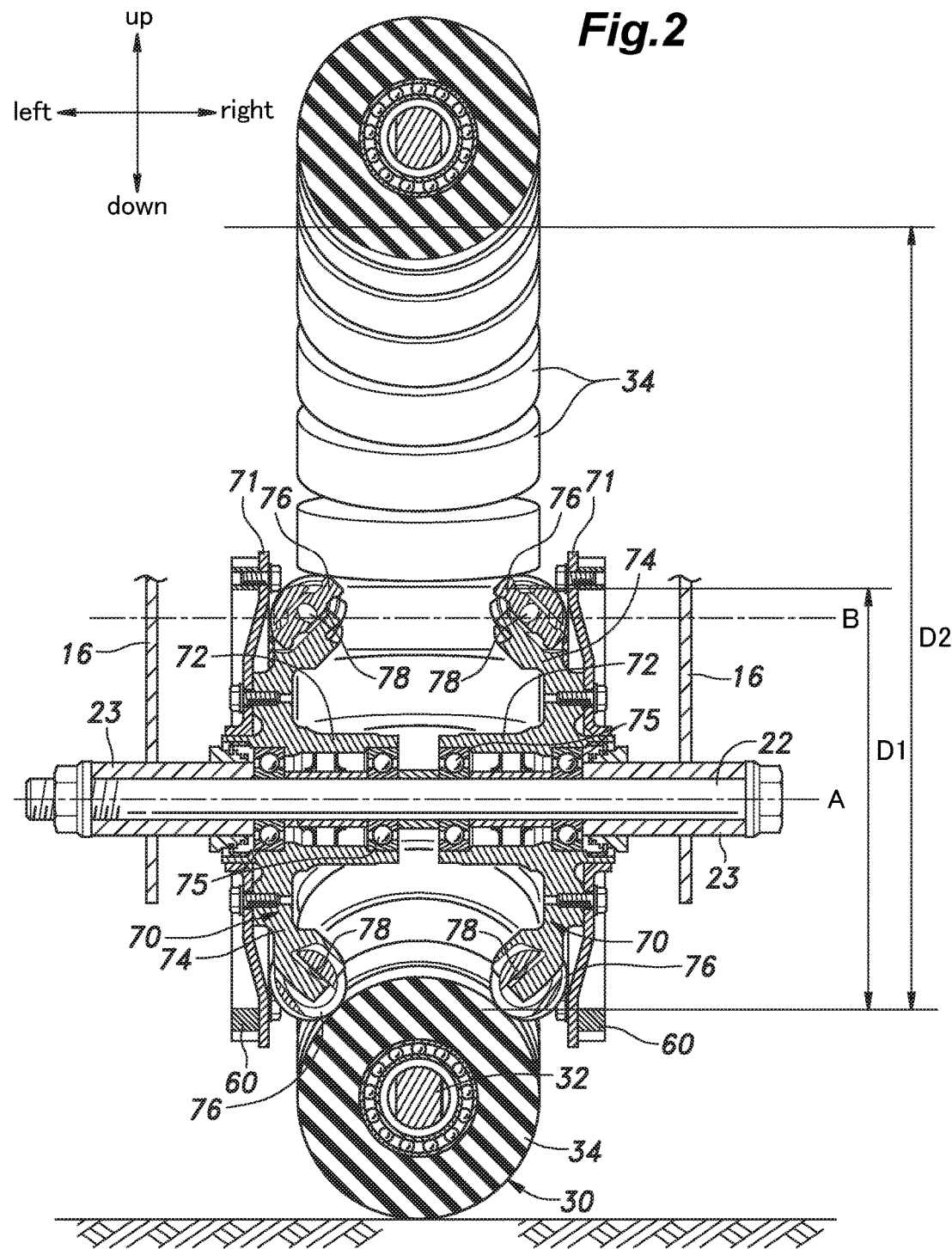
FIG. 2 is a front view of the frictional propulsion device.
Figure 3:
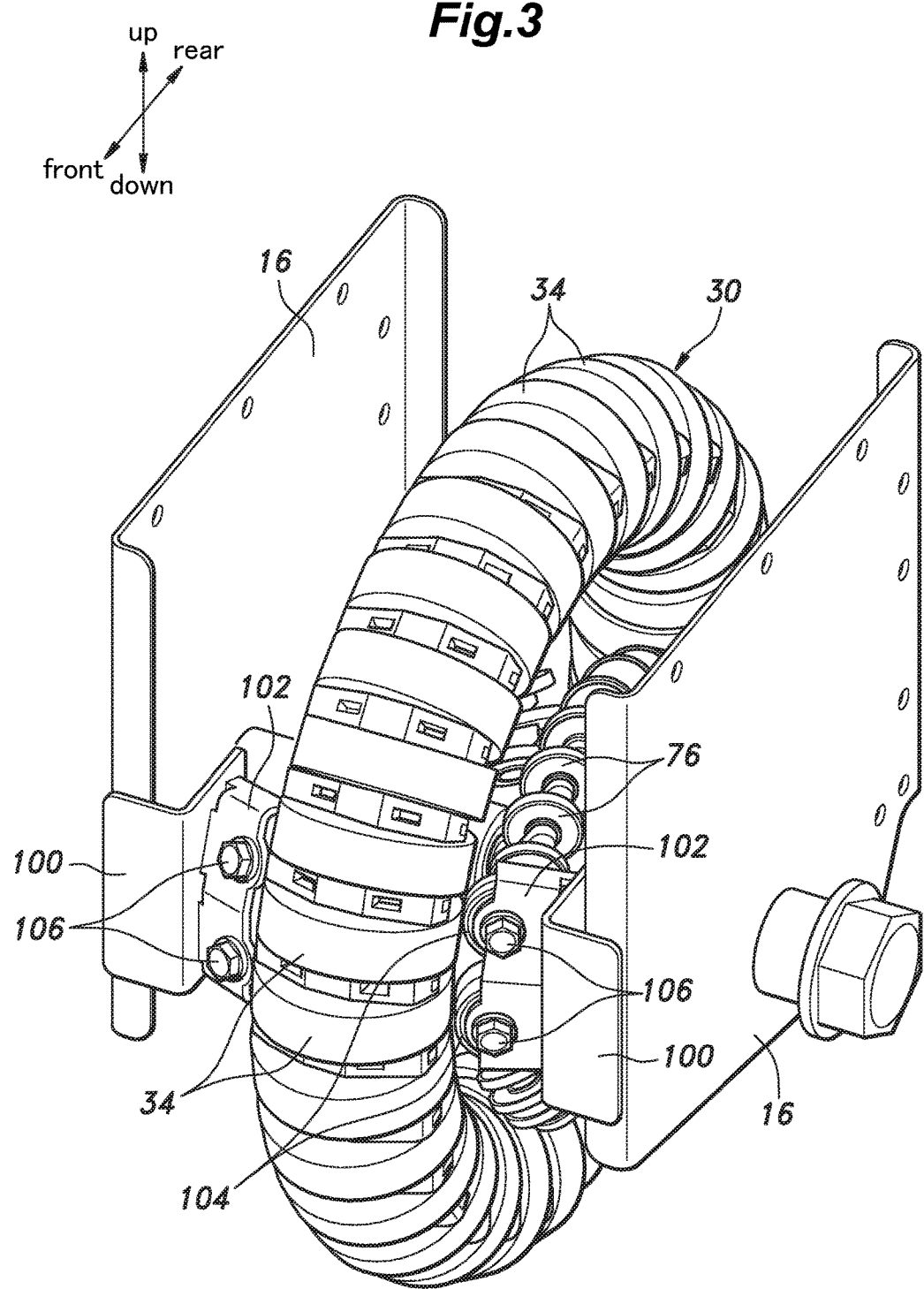
FIG. 3 is a perspective view of a part of the frictional propulsion device.

As shown in FIGS. 1 and 2, the inverted pendulum vehicle (omni-directional vehicle) of the illustrated embodiment includes a vehicle body frame 10. The vehicle body frame 10 includes a pair of upper cross members 12 positioned one behind the other, a pair of side members 14 extending downward from either lateral end of each cross member 12 and a pair of lower support plates 16 each joining the lower parts of the side members 14 on the corresponding side with each other. The support plates 16 extend in parallel to each other both in the vertical and the fore and aft directions. A saddle 18 is mounted on top of the upper cross members 12, and a pair of foot rests 20 are mounted on the lower parts of the respective support plates 16.

A main wheel 30 and a pair of drive disks 70 flanking the main wheel 30 are positioned between the two support plates 16.

As best illustrated in FIG. 2, the main wheel 30 includes an annular core member 32 centered around a laterally extending rotational center line (central axial line) B, and a plurality of driven rollers 34 each mounted on the annular core members 32 so as to rotatable around the tangential line of the annular core member 32 at the corresponding point (or around a cross sectional center line of the annular core member 32). The annular core member 32 is made of stiff material such as metallic material, and the driven rollers 34 are each provided with an elastomeric outer periphery.

The two drive disks 70 are arranged symmetric to each other on either side of the main wheel 30 as illustrated in FIGS. 1 and 2, and are each provided with a tubular hub 72 and a wheel 74 extending radially outward from the outer periphery of the hub 72. A plurality of drive rollers 76 are rotatably supported on each wheel 74 via respective roller support shafts 78 at a regular angular interval in a coaxial relationship to the rotational center line (central axial line) A. Each roller support shaft 78 extends in a skewed relationship to the rotational center line A of the drive disk 70. The outer periphery of each drive roller 76 is made of relatively stiff material such as metallic material and hard plastic material.

Thus, the drive rollers 76 are positioned along the circumferential direction of the wheel 74 in the manner of the teeth of a helical gear, and the drive rollers 76 are arranged in relation to the central axial line A of the drive disks 70 in a rotationally symmetric manner A tubular sleeve 23 is passed horizontally through each lower support plate 16. A disk support shaft 22 is passed into the tubular sleeves 23 of the both lower support plates 16 and the inner bores of the hubs 72 of the drive disks 70. The hubs 72 are rotatably supported by the disk support shaft 22 each via a pair of ball bearings 75. Tubular spacers are fitted on the disk support shaft 22 to define the spacing between the ball bearings 75. The disk support shaft 22 is provided with an enlarged head on one end and a threaded portion on the other end, and the axial spacing between the drive disks 70 is maintained by fastening a nut onto the threaded part of the disk support shaft 22, and clamping the bearings 75 with the tubular spacers and the tubular sleeves 23. Thus, the two drive disks 70 are supported by the disk support shaft 22 in a freely and individually rotatable manner around the common horizontal rotational center line A which is in parallel with the rotational center line B of the main wheel 30.

When each drive disk 70 is rotatively actuated as will be described hereinafter, the point of contact between the drive rollers 76 and the driven rollers 34 moves along an imaginary circle drawn on the main wheel 30, and this circle is named as a driven side imaginary circle. A similar imaginary circle may be drawn on each drive disk, and this is named as a drive side imaginary circle.

The diameter D1 of the drive side imaginary circle is smaller than the diameter D2 of the driven side imaginary circle (D1<D2). For instance, the diameter D1 of the drive side imaginary circle may be about one half of the diameter D2 of the driven side imaginary circle. Because the two drive disks 70 have the common central axial line A which is in parallel with the central axial line B of the main wheel 30, the drive side imaginary circle and the driven side imaginary circle are located on a plane perpendicular to the central axial lines A and B.

The fact that the diameters of the two imaginary circles differ from each other also means that the central axial line B of the main wheel 30 is vertically offset from the central axial line A of the drive disks 70 by one half of the difference between the diameters D1 and D2 of the two imaginary circles. Also, the drive rollers 76 engage only those driven rollers 34 that are located in the lower most position, and the contact between the drive rollers 76 and the driven rollers 34 occur in a symmetric manner in the fore and aft direction about a vertical and lateral plane passing through the road contact point of the main wheel 30. Ideally, only the driven roller 34 engaging the road surface is in engagement or in a power transmitting relationship with the drive rollers 76. By selecting the diameter of the drive disks 70 to be substantially smaller than the main wheel 30, the number of drive rollers 76 provided on each drive disk 70 can be reduced, and this contributes to the compact and economical design of the drive disks 70.

When a rider is seated on the saddle 18, the weight of the rider is transmitted to the disk support shaft 22 via the vehicle body frame 10 so that the lower most drive rollers 76 apply downward pressure to the driven rollers 34 of the main wheel 30 that are in contact with the road surface. The number of driven rollers 34 in contact with the road surface at any particular moment is one to two, but could be three or more when a rider is seated on the saddle 18 because of the downward pressure transmitted to the driven rollers 34 via the vehicle body frame 10, the disk support shaft 22, the drive disks 70 and the drive rollers 76. The number of driven rollers 34 in contact with the road surface may vary not only depending on the weight of the rider but also depending on the elastic property of the driven rollers 34.

As shown in FIGS. 1 to 5, a pair of yoke brackets 102 are fixedly secured to the front edges of the respective lower support plates 16 each via a mounting plate 100, and another pair of yoke brackets 102 are fixedly secured to the rear edges of the respective lower support plates 16 each via a mounting plate 100. Each yoke bracket 102 rotatably supports a pair of guide rollers 104 which are in rolling engagement with the main wheel 30 and arranged along the circumferential direction of the main wheel 30. Thus, a front part of the main wheel 30 (which is not in contact with the drive rollers 76) is interposed between the guide rollers 104 supported by the front edges of the respective lower support plates 16 via the respective yoke brackets 102, and a rear part of the main wheel 30 (which is not in contact with the drive rollers 76) is similarly interposed between the guide rollers 104 supported by the rear edges of the respective lower support plates 16 via the respective yoke brackets 102.

Figure 5:
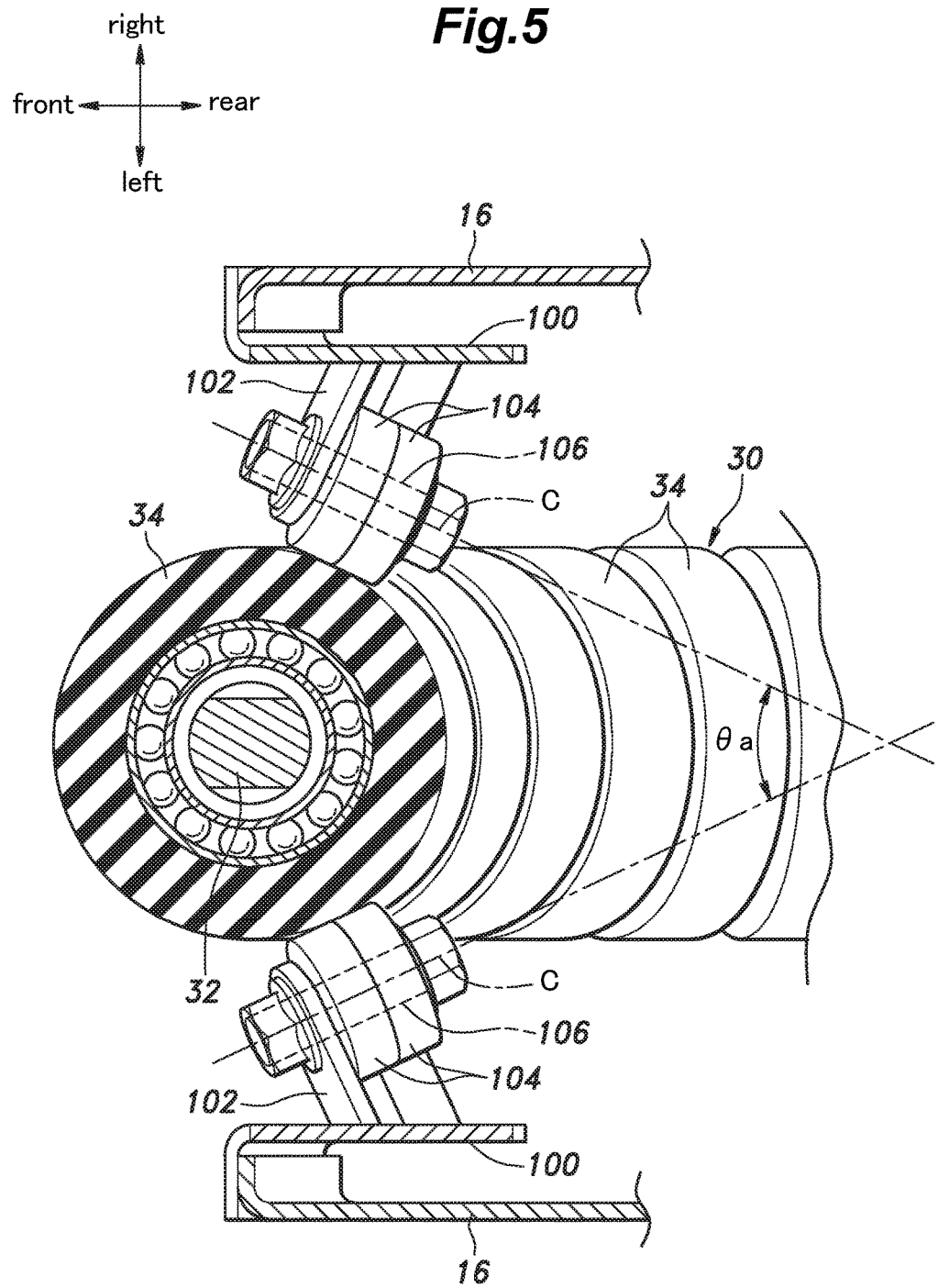
FIG. 5 is an enlarged sectional plan view of the frictional propulsion device.

Each guide roller 104 is rotatable around a central axial line (rotational center line) C which extends in the tangential line of the driven roller 34 with which the particular guide roller 104 is in contact. Also, each guide roller 104 contacts a part of the main wheel 30 which is radially more inward than the cross sectional center line of the annular core member 32. As shown in FIG. 5, the rotational center line of each guide roller 104 is in parallel with the tangential line of the point on the outer circumferential line of the driven roller 34 at which the guide roller 104 is in contact with the driven roller 34. The trajectory of the points at which the drive rollers 76 contact the driven rollers 34 defines a circle concentric to the rotational center line of the main wheel 30, and the trajectory of the points at which the guide rollers 104 contact the driven rollers 34 also defines a circle concentric to the rotational center line of the main wheel 30 which is greater in diameter than the circle defined by the drive rollers 76.

Figure 4:
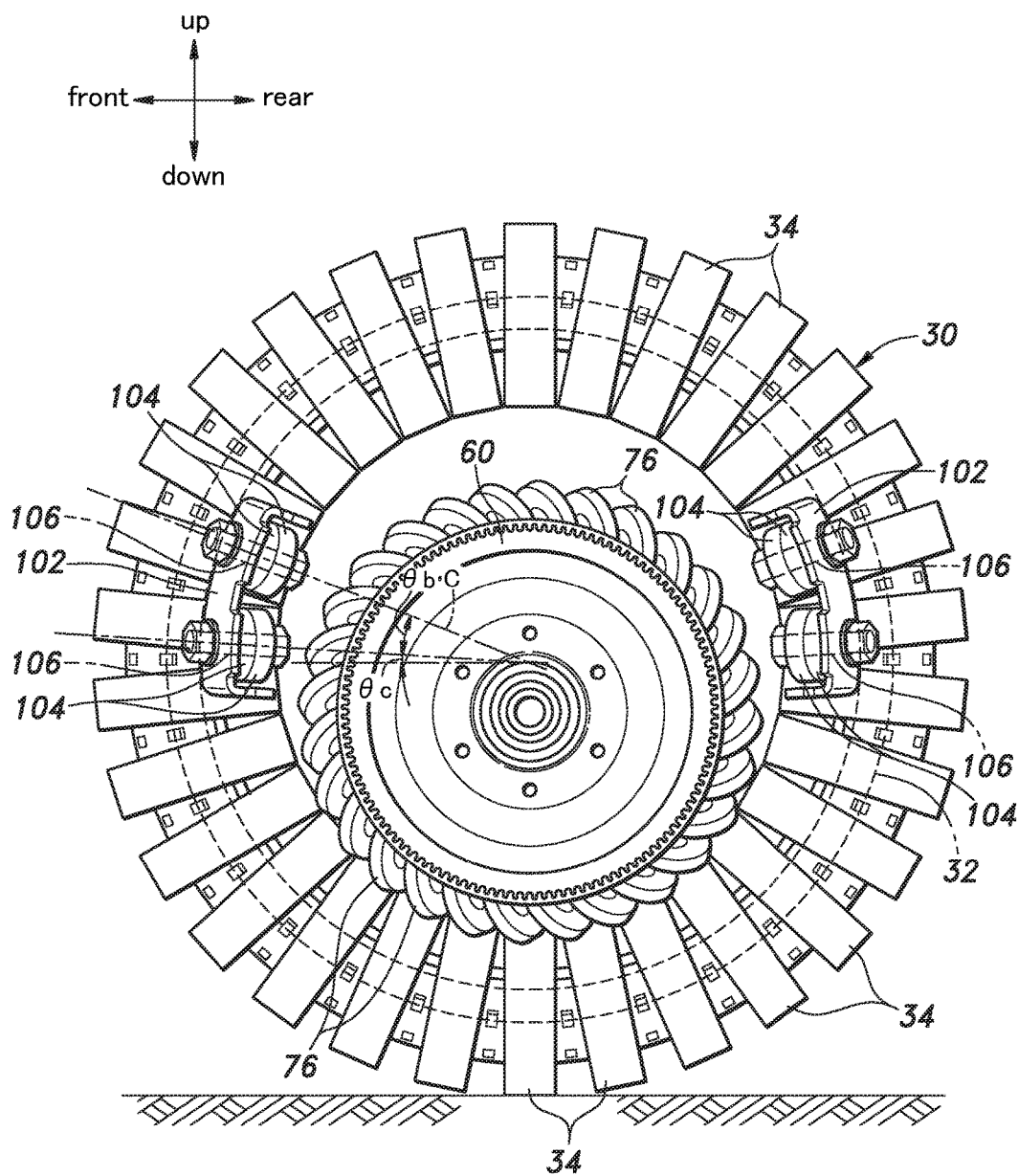
FIG. 4 is a side view of a part of the frictional propulsion device.

As shown in FIG. 4, the angle θb of the rotational center line C of the upper one of each guide roller pair supported by the common yoke bracket 102 with respect to the horizontal plane (as measured in a plane containing the rotational center lines C of the adjoining pair of guide rollers 104) may be 10 to 20 degrees. The angle of the rotational center line C of the lower one of the guide roller pair with respect to the horizontal plane is greater than zero, but more preferably greater than a certain angle θc so that this guide roller 104 may still be above the center of the main wheel 30 even when the vehicle body frame 10 along with the yoke brackets 102 has descended to a certain extent owing to the loading of the vehicle body frame 10.

The two guide rollers 104 supported by each yoke bracket 102 are circumferentially spaced apart from each other by an angle which is one and a half of the angular pitch of the driven rollers 34. Therefore, without regard to the rotational angular position of the main wheel 30, at least one of the guide rollers 104 is in contact with one of the driven rollers 34. The spacing between the two rollers 104 is not necessarily required to be one and a half of the angular pitch of the driven rollers 34, but it suffices if the angular pitch of the guide rollers 104 does not coincide with the angular pitch of the driven rollers 34. Most preferably, the guide rollers 104 are arranged in adjoining pairs on each side of a front part of the main wheel 30 and a rear part of the main wheel 30, and the guide rollers 104 of each adjoining pair are angularly spaced from each other by N and a half times of an angular spacing between the adjoining driven rollers 34, N being a natural number.

A driven pulley 60 is attached on the outer side of each wheel 74 via a circular mounting plate 71 in a concentric manner As shown in FIG. 1, an upper part of the vehicle body frame 10 supports a gear box 62 such that the gear box 62 is positioned directly above the main wheel 30. An electric motor 64 and a drive pulley 66 are provided on each side wall of the gear box 62 both having central axial lines extending in the lateral direction (only one of the electric motors 64 and one of the drive pulleys 66 are shown in FIG. 1). The gear box 62 houses a pair of speed reduction units (not shown in the drawings) so that the rotational power of each electric motor 64 is transmitted individually to the corresponding drive pulley 66 at a reduced rotational speed. An endless cogged belt 68 is passed around each drive pulley 66 and the corresponding driven pulley 60 (only the left cogged belt 68 is shown in FIG. 1). Thus, the two drive disks 70 can be individually driven by the corresponding electric motors 64.

As shown in FIG. 1, a base end of a tail wheel support arm 92 is attached to the lower support plates 16 via an arm support shaft 90. The tail wheel support arm 92 extends rearward from the base end thereof, and can be pivoted vertically via the central axial line of the arm support shaft 90. The free end of the tail wheel support arm 92 supports a tail wheel (secondary wheel) 94 consisting of an omni wheel in a rotatable manner around a substantially horizontally and longitudinally extending central axial line E. The tail wheel 94 can be rotatively actuated by an electric motor 96 mounted on the tail wheel support arm 92 around the central axial line E. The tail wheel 94 includes a plurality of free rollers so that the tail wheels 94 may be dragged in the fore and aft direction substantially without any frictional resistance from the road surface.

An electric box 98 which is attached to the front end of the gear box 62 houses various electronic and electric units such as an electronic control unit, a gyro sensor and motor drive units. The electronic control unit controls the two electric motors 64 for driving the drive disks 70 so that the vehicle body frame 10 maintains an upright posture according to an inverted pendulum control principle, and the electric motor 96 for cornering the vehicle as required. The vehicle body frame 10 further supports a battery (not shown in the drawings) for supplying electric power to the various electric motors, and the electric and electronic units.

When the two electric motors 64 are driven in the same direction at the same speed, the two drive disks 70 rotate in the same direction at the same speed so that the rotation of the drive rollers 76 around the rotational center line of the drive disks 70 causes the driven rollers 34 to be frictionally driven into rotation around the rotational center line of the main wheel 30. As there is no speed difference between the two drive disks 70, the main wheel 30 simply rotates around the rotational center line B of the main wheel 30 without the driven rollers 34 rotating around the respective rotational lines thereof. Therefore, the vehicle travels either forward or rearward (depending on the rotational direction of the electric motors 64) along a straight path.

When the two electric motors 64 are driven in different directions and/or at different speeds, the two drive disks 70 rotate at different speeds and/or in different directions so that the driven rollers 34 are caused to rotate around the respective rotational center lines thereof so the drive rollers 76 frictionally drive the driven rollers 34. As a result, the main wheel 30 is driven sideways.

By appropriately selecting the speed difference between the two drive disks 70, the main wheel 30 may be caused to travel in any desired oblique direction which may be given as a vector sum of the sideway movement caused by the rotation of the driven rollers 34 and the forward or rearward movement caused the rotation of the main wheel 30.

When the tail wheel 94 is rotatively actuated by the electric motor 96, the vehicle is caused to turn around a vertical line passing through the road contact point of the main wheel 30. Thus, by driving both the main wheel 30 and the tail wheel 94, the vehicle is enabled to travel in any desired direction and undergo a yaw movement at will.

In the illustrated embodiment, two pairs of guide rollers 104 engage the driven rollers 34 in a front part of the main wheel 30 from either side, and another two pairs of guide rollers 104 engage the driven rollers 34 in a rear part of the main wheel 30 from either side. Each guide roller 104 engages those driven rollers 34 located in an upper part of the main wheel 30. Therefore, the main wheel 30 is prevented from tilting sideways or making a rolling movement around the road contact point of the main wheel 30.

Owing to this arrangement, even though D1<D2 or the rotational center line A of the drive disks 70 is substantially lower than the rotational center line B of the main wheel 30, the main wheel 30 is prevented from tilting sideways with respect to the vehicle body frame 10 so that the contact between the drive rollers 76 and the driven rollers 34 is maintained in a fixed condition, and a stable motion of the main wheel 30 free from vibrations is ensured. This effect is enhanced owing to the provision of the guide rollers 104 in both the front part and the rear part of the main wheel 30.

Furthermore, the guide rollers 104 engage the driven rollers 34 both in a front part and a rear part of the main wheel 30, the main wheel 30 is prevented from rotating around a vertical line passing through the ground contact point of the main wheel 30 or is prevented from undergoing a yaw movement relative to the vehicle body frame 10. Also, the main wheel 30 is prevented from moving in the fore and aft direction with respect to the vehicle body frame 10. Thus, even though the drive rollers 76 of the two drive disks 70 interpose only those driven rollers 34 of the main wheel 30 that are located in a lower part of the main wheel 30, the main wheel 30 is prevented from undergoing a yawing movement, a rolling movement or a fore and aft movement relative to the vehicle body frame 10.

If the angle defined by the rotational center line of each guide roller 104 and that of the corresponding guide roller 104 on the other side of the main wheel 30 or an interposing angle θa is great (FIG. 5), the yaw movement and the roll movement of the main wheel 30 can be effectively prevented. If the interposing angle θa is small, the fore and aft movement of the main wheel 30 can be effectively prevented. According to the tests conducted by the inventors, it was determined that the main wheel 30 can be supported by the guide rollers 104 in a satisfactory manner when the interposing angle θa is between 30 and 90 degrees.

Owing to the positioning of the guide rollers 104 such that the spacing of the guide roller pair at each of the four locations, both sides of each of the front and rear parts of the main wheel 30, does not coincide with the spacing of the driven rollers 34 or differs from the spacing of the driven rollers 34 by one half of the spacing of the driven rollers 34, the driven rollers 34 are engaged by the guide rollers at the four locations at all times. Therefore, the main wheel 30 is prevented from undergoing a roll movement, a yaw movement or a fore and aft movement with respect to the vehicle body frame 10 at all times.

Because the rotational center line of each guide roller 104 extends in a radial direction of a circle defined by a cross sectional center of the core member when projected onto a plane containing the circle defined by the cross sectional center of the core member 32, the guide rollers 104 do not prevent the rotation of the main wheel 30.

The guide rollers 104 may prevent the rotation of those driven rollers 34 that are being engaged by the guide rollers 104, but such driven rollers 34 are not engaged by the drive rollers 76 so that the driven rollers 34 are not prevented from rotating round the rotational center lines thereof.

The main wheel 30 is prevented from moving upward relatively to the vehicle body frame 10 by the engagement between the driven rollers 34 and the drive rollers 76 at the lowermost part of the main wheel 30, and is prevented from moving downward relative to the vehicle body frame 10 by the engagement between the driven rollers 34 and the guide rollers 104 that engage upper parts of the main wheel 30. Therefore, even when the vehicle body frame 10 is lifted upward, the main wheel 30 is prevented from moving vertically relative to the vehicle body frame 10.

The number of guide rollers 104 in the illustrated embodiment was eight, but may also be smaller or greater in number without departing from the spirit of the present invention. Also, the main wheel 30 had a significant larger diameter than the drive disks in the illustrated embodiment, but may also be substantially equal to the drive disks.

Although the present invention has been described in terms of a preferred embodiment thereof, it is obvious to a person skilled in the art that various alterations and modifications are possible without departing from the scope of the present invention which is set forth in the appended claims. The contents of the original Japanese patent application on which the Paris Convention priority claim is made for the present application as well as the contents of the prior art references mentioned in this application are incorporated in this application by reference.

The invention claimed is:

1. A frictional propulsion device, comprising:
a body frame;
a main wheel including an annular core member having a rotational center line extending laterally and a plurality of driven rollers fitted on and arranged circumferentially along the annular core member so as to be rotatable around tangential lines of the annular core member at respective positions thereof on the annular core member;
a support shaft supported by the body frame and extending laterally across an interior of the main wheel;
a pair of drive disks positioned on either side of the main wheel and rotatably supported by the support shaft;
a plurality of drive rollers supported along an outer periphery of each drive disk so as to be each rotatable around a rotational center line extending in a skewed relationship to a rotational center line of the corresponding drive disk, an outer circumferential surface of each drive roller being in engagement with an outer circumferential surface of the driven rollers;

a drive unit supported by the body frame to individually rotatively drive the drive disks; and a plurality of guide rollers rotatably supported by the body frame and engaging at least one of the driven rollers not engaged by any of the drive rollers from either side.

2. The frictional propulsion device according to claim 1, wherein a rotational center line of each guide roller extends in a radial direction of a circle defined by a cross sectional center of the core member when projected onto a plane containing the circle defined by the cross sectional center of the core member.

3. The frictional propulsion device according to claim 2, wherein each guide roller engages the driven rollers at a point inward of the circle defined by the cross sectional center of the core member, and the guide rollers interpose the driven rollers from either side such that the rotational center lines of the guide rollers interposing the driven rollers from either side form an angle smaller than 90 degrees.

4. The frictional propulsion device according to claim 2, wherein the guide rollers engage the driven rollers at a point inward of the circle defined by the cross sectional center of the core member, and are arranged on each side of a front part of the main wheel and a rear part of the main wheel.

5. The frictional propulsion device according to claim 4, wherein the guide rollers are arranged in adjoining pairs on each side of a front part of the main wheel and a rear part of the main wheel, and the guide rollers of each adjoining pair are angularly spaced from each other by N and a half times of an angular spacing between the adjoining driven rollers, N being a natural number.

6. The frictional propulsion device according to claim 1, wherein each guide roller engages the driven rollers at a point higher than the rotational center line of the main wheel.

7. The frictional propulsion device according to claim 1, wherein a drive contact circle defined by points on the drive rollers at which the drive rollers contact the driven rollers is smaller than a driven contact circle defined by points on the driven rollers at which the driven rollers contact the drive rollers, and the drive rollers engage only those driven rollers that are located in a lower part of the main wheel.

8. The frictional propulsion device according to claim 7, wherein a rotational center line of the support shaft extends in parallel with the rotational center line of the main wheel, and the drive contact circle and the driven contact circle define planes that are parallel to each other.

9. A vehicle, comprising:
a frictional propulsion device according to claim 1;
a saddle mounted on an upper part of the body frame; and
a pair of foot rests projecting laterally from either side of a lower part of the body frame.

* * * * *